June 13, 1939.  A. GOULARD  2,162,502
INSECT TRAP
Filed Dec. 24, 1937  2 Sheets-Sheet 1

INVENTOR.
Alexander Goulard
BY
ATTORNEY.

June 13, 1939.  A. GOULARD  2,162,502
INSECT TRAP
Filed Dec. 24, 1937  2 Sheets-Sheet 2
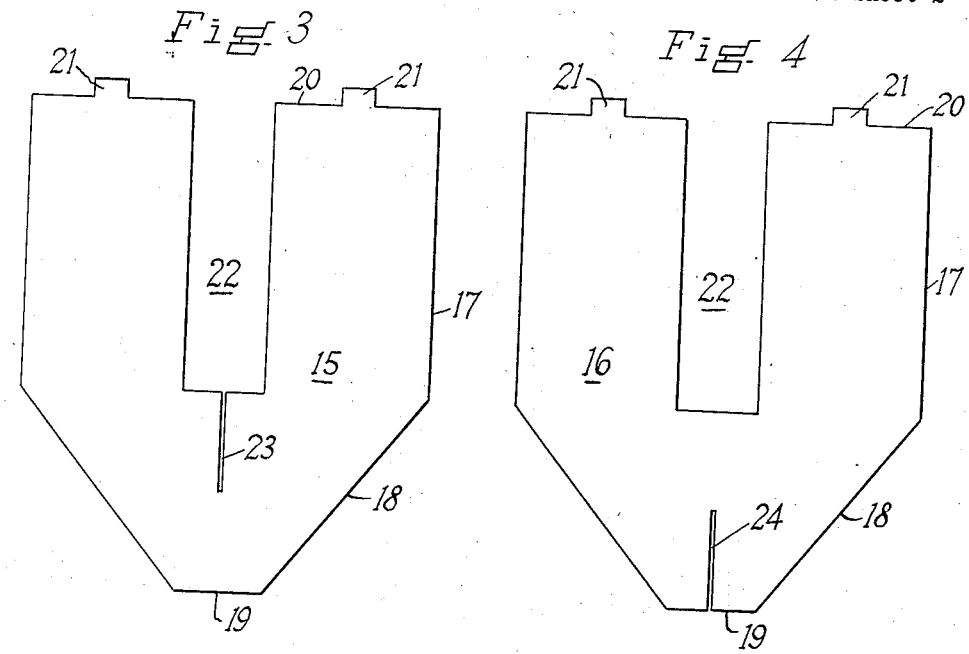
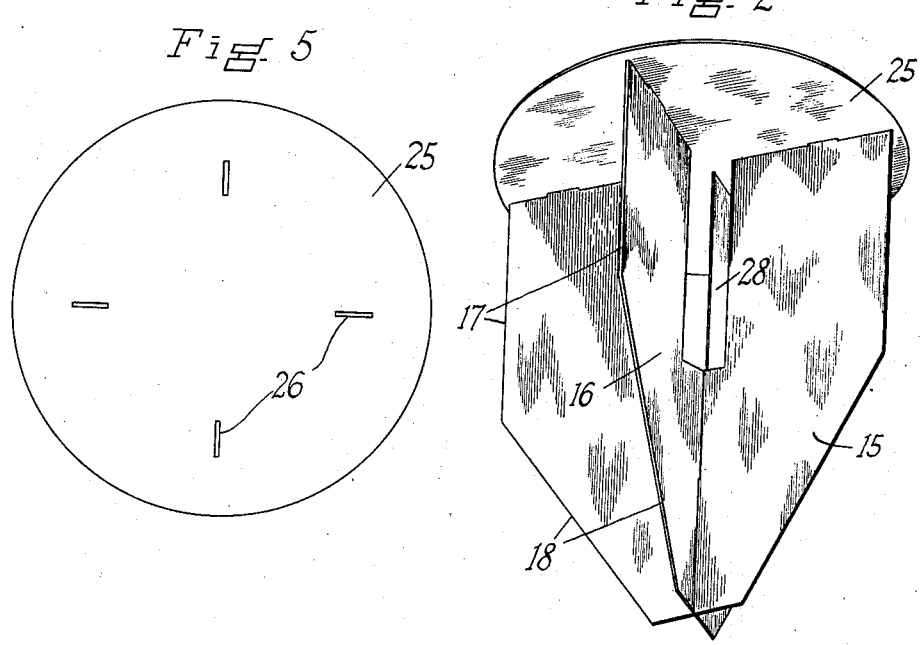
INVENTOR.
Alexander Goulard
BY
ATTORNEY.

Patented June 13, 1939

2,162,502

UNITED STATES PATENT OFFICE 2,162,502

INSECT TRAP

Alexander Goulard, Westfield, N. J.

Application December 24, 1937, Serial No. 181,626

6 Claims. (Cl. 43—107)

The present invention relates in general to the construction of insect traps, and more particularly to improvements in the construction of insect traps of the type in which the insects are attracted by a suitable bait located intermediate a group of vertical baffle plates defining passages leading to an insect collecting receptacle.

The main object of my invention is the provision of an improved construction of an insect trap of the type described which is characterized by its ease of assembly and disassembly, relatively low cost of manufacture, large effective baffle area, ease of bait renewal, durability, and effectiveness in use.

The various features of novelty which characterize my invention are pointed out with particularity in the claims annexed to and forming a part of this specification. For a better understanding of the invention, its advantages and specific objects attained by its use, reference should be had to the accompanying drawings and descriptive matter in which I have illustrated and described a preferred embodiment.

Of the drawings:

Fig. 2 is a perspective view of the baffle and top plate assembly;

Figs. 3 and 4 are elevations of the two baffle plates; and

Fig. 5 is a plan view of the top plate.

Figure 1:
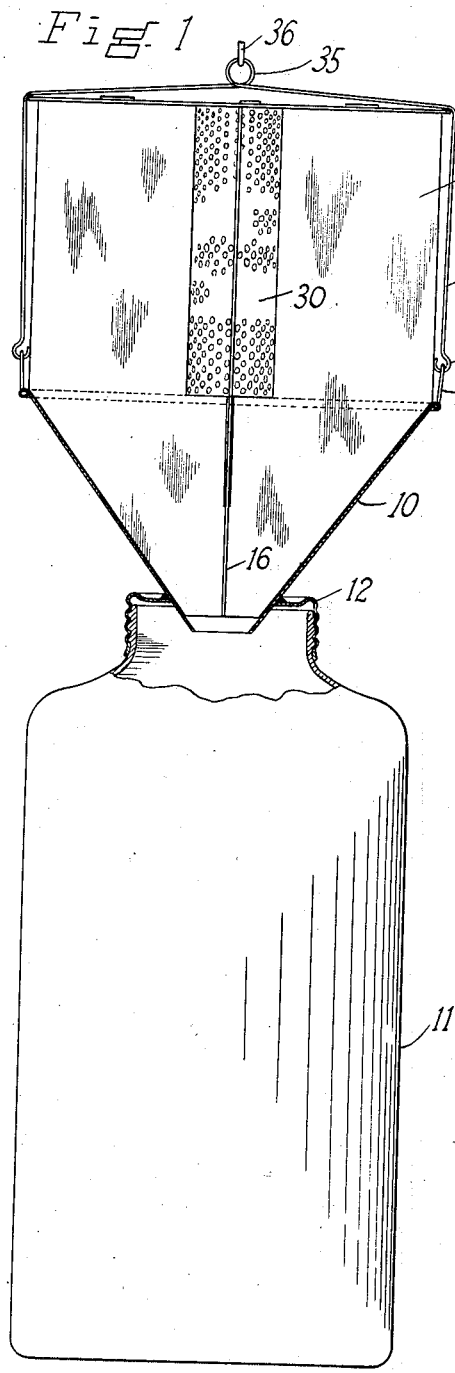
Fig. 1 is an elevation, with parts broken away and in section, of an assembled trap embodying the invention.

The insect trap illustrated comprises an inverted frusto-conical metallic funnel 10 open at its ends. The lower restricted end of the funnel opens into an insect collecting chamber formed by a suitable receptacle 11, such as a mason jar, which may be slit or perforated if desired for drainage purposes. A perforated receptacle cap 12 surrounds and is rigidly secured to the lower part of the funnel. Screw threads formed on the cap and receptacle top provide a detachable connection therebetween.

The funnel 10 is arranged to receive the lower portion of a cruciform baffle structure formed by a pair of flat metal plates 15 and 16. As shown, the plates 15, 16 are of similar size and shape, each having an upper portion with parallel vertical side edges 17 and a lower portion with symmetrical side edges 18 converging at an angle corresponding to the slope of the funnel and terminating at a narrow bottom edge 19. The top edges 20 of the plates are formed with a pair of symmetrically arranged projecting lugs 21. Each of the plates has a medial cutout portion of vertically elongated rectangular shape, as indicated at 22, extending from the top edge 20 to approximately the level of the lower end of the side edges 17. As shown in Fig. 3, the baffle plate 15 has a narrow medial slot 23 extending from the lower edge of the cutout portion 22 halfway to the lower edge 19, while the plate 16 has a similar slot 24 extending from the lower edge 19 halfway to the lower edge of the cutout portion 22.

With this construction the baffle plates can be detachably interlocked in intersecting normal planes, as shown in Figs. 1 and 2, by assembling the plates with the upper end of the slot 24 resting on the bottom of the slot 23. The slots are so proportioned in length that when the plates are assembled as described the lower edges of the cutout portions 22 will be in the same horizontal plane and the lower edges 19 of the baffle plates in a parallel plane. The baffle plates are secured in their assembled formation by a circular metallic top or cover plate 25 having short narrow slots 26 arranged to receive the lugs 21 on the baffle plates. The otherwise imperforate top plate is of sufficient diameter to extend slightly beyond the baffle plate side edges 17 when in contact with the top edges. The lugs 21 extend through the slots 26 and their projecting portions are bent down to hold the plates 15, 16 and 25 assembled.

The medial cutout portions of the baffle plates define a central space 28 in which the insect bait can be advantageously located. For this purpose, a removable bait holder or cartridge 30, preferably formed by a perforated cylinder of waterproof material containing a suitable bait, is inserted in the space 28 with the lower end of the holder supported on the lower edges of the cutout portions 22. As shown in Fig. 1, this arrangement will expose approximately one-quarter of the perforated peripheral surface of the bait holder to each of the four passages or chambers formed by the baffle plates.

As shown in Fig. 1, the baffle assembly fits snugly in the funnel 10 with the bait holder and upper portion of the baffle extending above the upper end of the funnel. The entire trap is supported and the baffle assembly held in place in the funnel by a wire bail 32 having hook-shaped ends 33 engaging rings 34 at diametrically opposite points on the upper edge of the funnel. The bail 32 extends across the top plate 25 and at its middle point is formed into a loop or ring 35 adapted to be engaged by a suitable supporting member 36, as indicated.

Insect traps of this type are especially adapted for catching Japanese beetles and for this use either a "wet" or "dry" bait containing geraniol and eugenol is preferably employed. The bait will require renewal several times during the normal infestation period and at such times the bait holders can be readily replaced by unfastening the bail 32 and removing the top plate 25. To insure preservation of the effectiveness of the bait, the bait holders are sold in a waterproof wrapping which is removed by the user when a fresh supply of bait is required in the trap.

In operation, the beetles are attracted by the odor of the bait issuing through the numerous perforations in the bait holder and enter the passages defined by the baffle plates. The baffle plates cause the beetles to drop into the funnel and thence to the receptacle 11, from which they can be periodically removed and destroyed.

The described trap can be readily assembled with a minimum of soldering operations. A relatively large baffle area is provided by the cruciform arrangement of the plates, while the flat construction of the baffle and top plates decreases the cost of manufacture and permits a compact arrangement of these parts when shipped disassembled. The plate interlocking arrangement and type of bail used form a rigid durable construction which can be readily cleaned or repainted. The relatively large area of the top plate protects the bait from excessive moisture and substantially decreases the amount of water entering the receptacle during rains. The use of a removable bait holder not only facilitates the bait renewal operation, but also insures that no moldy bait will remain in the trap when new bait is added.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. An insect trap comprising an open-ended upright funnel, and a cruciform baffle having its lower portion fitting into said funnel and formed by a pair of vertical plates having medial slotted tapering lower portions arranged to detachably interlock, with the plates in intersecting normal planes, a circular top plate extending over the top edges of said baffle plates, means for detachably interlocking said baffle plates and top plate, and a wire bail detachably connected to diametrically opposite portions of said funnel and extending over said top plate and holding said baffle and top plates in assembled position in said funnel.

2. An insect trap comprising an open-ended upright funnel, a cruciform baffle having its lower portion fitting into said funnel and formed by a pair of vertical plates arranged with the plates in intersecting normal planes, said plates having upper medial cutout sections forming a central space and support for a bait holder, a circular top plate extending over the entire top edges of said baffle plates, means for detachably interlocking said baffle plates and top plate, a wire bail connected to diametrically opposite portions of said funnel and extending over said top plate and holding said baffle and top plates in assembled position in said funnel, a receptacle top surrounding and secured to the lower portion of said funnel, and an insect receptacle detachably connected to said receptacle top.

3. An insect trap comprising an open-ended upright funnel, and a cruciform baffle having its lower portion snugly fitting into said funnel and formed by a pair of vertical plates having medial slotted tapering lower portions arranged to detachably interlock with the plates in intersecting normal planes, said plates having upper medial cutout sections forming a central space and support for a bait holder, a circular top plate extending over the entire top edges of said plates, means for detachably interlocking said baffle plates and top plate, a wire bail detachably connected to diametrically opposite portions of said funnel and extending over said top plate and holding said baffle and top plates in assembled position in said funnel, a receptacle top surrounding and secured to the lower portion of said funnel, and an insect receptacle detachably connected to said receptacle top.

4. An insect trap comprising an open-ended upright funnel, and a cruciform baffle having its lower portion fitting into said funnel and formed by vertical plates arranged in intersecting planes, a top plate extending over the top edges of said baffle plates, means for detachably connecting said baffle plates and top plate, and a wire bail connected to opposite portions of said funnel and extending over said top plate and holding said baffle and top plate in assembled position in said funnel.

5. An insect trap comprising an open-ended upright funnel, and a cruciform baffle having its lower portion fitting into said funnel and formed by vertical plates arranged in intersecting normal planes, said baffle having cutaway sections forming a central space and support for a bait holder, a top plate extending over the top edges of said plates, means for detachably interlocking said baffle plates and top plate, and a wire bail connected to diametrically opposite portions of said funnel and extending over said top plate and holding said baffle and top plates in assembled position in said funnel.

6. An insect trap comprising an open-ended upright funnel, and a cruciform baffle having its lower portion fitting into said funnel and formed by a pair of vertical plates detachably connected with the plates in intersecting normal planes, said plates having upper medial cutaway sections forming a central space and support for a bait holder, a circular top plate extending over the entire top edges of said plates, means for detachably interlocking said baffle plates and top plate, and a wire bail detachably connected to diametrically opposite portions of said funnel and extending over said top plate and holding said baffle and top plates in assembled position in said funnel.

ALEXANDER GOULARD.